(12) United States Patent
Cadalen et al.

(10) Patent No.: US 11,396,348 B2
(45) Date of Patent: Jul. 26, 2022

(54) TOWFISH WITH REVERSIBLE VARIABLE HYDRODYNAMIC LIFT AND TOWING LINE COMPRISING THE TOWFISH

(71) Applicant: THALES, Courbevoie (FR)

(72) Inventors: François Cadalen, Brest (FR); François Warnan, Brest (FR); Olivier Jezequel, Brest (FR); Jean-Philippe Longuet, Brest (FR); Philippe Vicariot, Brest (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/955,032

(22) PCT Filed: Dec. 18, 2018

(86) PCT No.: PCT/EP2018/085585
§ 371 (c)(1),
(2) Date: Jun. 17, 2020

(87) PCT Pub. No.: WO2019/121743
PCT Pub. Date: Jun. 27, 2019

(65) Prior Publication Data
US 2020/0377179 A1    Dec. 3, 2020

(30) Foreign Application Priority Data

Dec. 19, 2017   (FR) .......................... 1701323

(51) Int. Cl.
*B63B 21/66* (2006.01)
*B63G 8/18* (2006.01)
(Continued)

(52) U.S. Cl.
CPC ................ *B63B 21/66* (2013.01); *B63G 8/18* (2013.01); *B63G 8/42* (2013.01); *G01S 15/89* (2013.01)

(58) Field of Classification Search
CPC ........... B63B 21/00; B63B 21/66; B63G 8/00; B63G 8/18; B63G 8/42
(Continued)

(56) References Cited

U.S. PATENT DOCUMENTS

| 3,613,626 A | 10/1971 | Kelly et al. | |
|---|---|---|---|
| 5,000,110 A | * 3/1991 | Moore | B63B 21/66 114/244 |

(Continued)

FOREIGN PATENT DOCUMENTS

| GB | 2 244 249 A | 11/1991 |
|---|---|---|
| GB | 2 309 952 A | 8/1997 |
| WO | 2016/135326 A1 | 9/2016 |

*Primary Examiner* — Lars A Olson
(74) *Attorney, Agent, or Firm* — BakerHostetler

(57) ABSTRACT

A body towed by a cable behind a ship and commonly referred to as a towfish, the towfish includes a structure configured to move through the water in a horizontal main direction and at least one appendage configured to generate on the towfish a downwardly directed hydrodynamic lift (P) when the towfish is moving through the water under the effect of the towing, the appendage being orientable so as to modify its lift. The towfish comprises a bracket capable of rotational movement with respect the structure about a horizontal axis perpendicular to the horizontal main direction, the cable being attached to the bracket. An orientation ($\gamma$) of the appendage, allowing it to alter the lift (P), is dependent on an angle ($\beta$) formed between the bracket and the structure about the horizontal axis.

11 Claims, 8 Drawing Sheets

(51) Int. Cl.
*B63G 8/42* (2006.01)
*G01S 15/89* (2006.01)

(58) Field of Classification Search
USPC ................................ 114/242, 244, 245, 330
See application file for complete search history.

(56) References Cited

U.S. PATENT DOCUMENTS 7,752,988 B2 * 7/2010 Axford .................... B63G 8/42
                                                       114/245
2008/0196651 A1    8/2008 Nigel

* cited by examiner

TOWFISH WITH REVERSIBLE VARIABLE HYDRODYNAMIC LIFT AND TOWING LINE COMPRISING THE TOWFISH

CROSS-REFERENCE TO RELATED APPLICATIONS

This application is a National Stage of International patent application PCT/EP2018/085585, filed on Dec. 18, 2018, which claims priority to foreign French patent application No. FR 1701323, filed on Dec. 19, 2017, the disclosures of which are incorporated by reference in their entirety.

FIELD OF THE INVENTION

The invention relates to bodies towed behind a ship. These objects are commonly referred to as towfish. They are notably used in the field of variable-submersion sonars. The towfish is then provided with acoustic receive and/or transmit antennas.

BACKGROUND

In order to correctly fulfill its mission, the towfish is provided with suitable hydrodynamic characteristics. Amongst other things, the towfish is configured to develop significant vertical forces which allow it to dive to a desired depth despite the towing speed which has a tendency to cause it to rise back up to the surface.

The simplest means for developing these vertical forces is to increase the weight of the towfish beyond the upthrust. The weight has the advantage of being constant regardless of the speed of the ship towing the towfish. Another means is to arrange on the towfish a set of hydrodynamic airfoils the lift of which is directed downward. Given the density of the water, these airfoils are fairly squat and can easily be housed on a towed body. The downwardly directed hydrodynamic lift force increases with the square of the speed of the towfish with respect to the water. As a result, the higher the speed the greater the extent to which the towfish remains submerged.

Towed sonars are used chiefly in the military domain. It may be that the ship operating with its sonar submerged to a depth has to suddenly take evasive action, for example if it becomes hunted by a torpedo. In that case, given the urgency, it is not possible to bring the towed body back on board. The evasive speed of the ship needs to be able to be withstood both by the towed body and by the towfish towing cable; the cable experiences a hydrodynamic drag that increases with the speed.

The cable needs to be rated to withstand a maximum tension generated by the ship for a given evasive speed. Other components, such as the towing machine and its fixings that attach it to the deck of the ship need also to be rated to withstand this maximum tension. A high evasive speed requires all the elements involved in the towing operation to be overrated. The overrating of the cable leads to its dimensions being increased, further increasing its hydrodynamic drag and therefore the tensile load on the cable.

While the ship is running evasive action, in order to limit the tension in the cable, one maneuver is to bring as much cable as possible back on board. In order to allow such a maneuver, the towing winch also needs to be overrated.

When the towed body is submerged and it is not possible to operate the winch there are two remaining solutions. The first is to limit the evasive speed of the ship and the second, in extreme circumstances, is to cut the towing line to prevent ill-timed breakage. That of course leads to the loss of the towed body.

Patent application WO 2016/135326 filed in the name of the applicant company describes a towfish equipped with an airfoil that gives it a downwardly oriented lift allowing it to remain at depth when towed. The towfish is equipped with a latch allowing the airfoil to be released and the lift of the towfish reduced. Once the latch has been released, the towfish rises back up to the surface and the pull of the cable decreases, allowing the ship that is towing the towfish to increase its speed. The control of the latch is rudimentary, giving it great simplicity and therefore good reliability. Once the latch has been released, the towfish maintains its reduced lift. When the towfish is being towed it is not possible to reset the latch to give the towfish its downwardly oriented maximum lift. Thus, once the latch has been triggered to reduce the lift of the towfish, the submersion of the towfish decreases so that the towfish is no longer able to continue its mission in full at the required depth. In order to reset the latch, it is necessary to bring the towfish back onboard the deck of the ship to lock the airfoil in the maximum-lift position. Only then can the towfish be returned to the water to resume its mission.

SUMMARY OF THE INVENTION

The invention seeks to alleviate all or some of the abovementioned problems by proposing in-water reversible means for reducing the lift of a towed towfish. More specifically, the invention proposes to control the lift of the towfish by means of the angle of the towing cable with respect to the towfish.

To that end, the subject of the invention is a towfish intended to be submerged and towed by a cable, the towfish comprising a structure configured to move through the water in a horizontal main direction and at least one appendage configured to generate on the towfish a downwardly directed hydrodynamic lift when the towfish is moving through the water under the effect of the towing, the appendage being orientable so as to modify its lift. According to the invention, the towfish comprises a bracket capable of rotational movement with respect to the structure about a horizontal axis perpendicular to the horizontal main direction, the cable being intended to be attached to the bracket. The towfish comprises a non-motorized mechanism configured so that an orientation of the appendage, allowing it to alter the lift, is dependent on an angle formed between the bracket and the structure defined on the basis of the horizontal main direction. A law connecting the angle to the orientation of the appendage is configured so that when the value of the angle decreases, the orientation of the appendage is increased in such a way as to reduce the hydrodynamic lift of the towfish.

Advantageously, over a range of values for the angle the law is unstable so that a given value for the orientation of the appendage leads to a reduction in the angle.

In one preferred configuration, beyond a first given angle value, the orientation of the appendage is fixed so as to generate what is referred to as the operational lift of the towfish, and below the first given angle value, the orientation of the appendage is increased as the value of the angle decreases so as to reduce the lift compared with the operational lift.

Advantageously, below a second given angle value less than the first given angle value, the orientation of the appendage is fixed so as to generate what is referred to as an evasion lift lower than the operational lift.

Below the second given angle value, the orientation of the appendage may be positive or zero.

There is defined a third angle value intermediate between the first and second angle value, and, between the first and the third angle value a law connecting the angle to the orientation of the appendage (27) is advantageously configured to keep the angle at a stable value.

The range of values for the angle in which the law is unstable is defined between the third and the second angle value. Over this range, the law is advantageously configured in such a way as to orient the appendage in order to achieve the evasion lift.

The towfish may comprise a lift-inducing airfoil forming the appendage, and a stabilizing empennage configured to keep a pitch attitude of the towfish substantially constant during changes to the orientation of the appendage.

The appendage may be able to move in rotation with respect to the structure about a second horizontal axis, the mobility of the appendage allowing the lift of the towfish to be modified, and the second horizontal axis of rotation of the appendage is positioned substantially at the instantaneous center of rotation of the towfish when the latter pivots as a result of a change in the orientation of the appendage.

The towfish advantageously comprises a cam and a cam follower, one being secured to the appendage and the other to the bracket and the cam follower presses against a shape on the cam as the bracket rotates about the horizontal axis.

The towfish advantageously comprises a first latch configured to keep the appendage in a fixed orientation when the value of the angle is beyond the first given angle value.

The towfish advantageously comprises a second latch configured to immobilize the bracket with respect to the structure when the value of the angle formed between the bracket and the structure is below the second given angle value.

BRIEF DESCRIPTION OF THE DRAWINGS

The invention will be better understood and further advantages may be apparent from reading the detailed description of one embodiment given by way of example, which description is illustrated by the attached drawing in which.

For the sake of clarity, throughout the various figures the same elements will bear the same references.

DETAILED DESCRIPTION

The invention is described with respect to the towing of a sonar by a surface vessel. It must of course be understood that the invention can be implemented in respect of other towed elements and other towing means.

Figure 1:
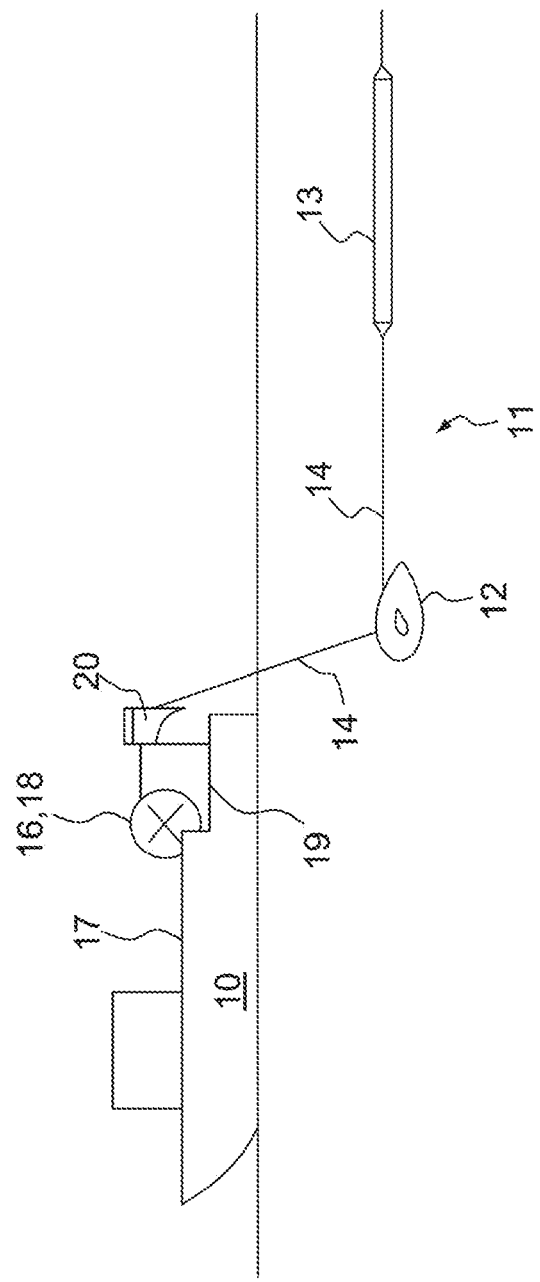
FIG. 1 schematically depicts a ship towing an active sonar.

FIG. 1 depicts a ship 10 towing an active sonar 11 comprising an acoustic transmit antenna 12 commonly referred to as a towfish and an acoustic receive antenna 13 commonly referred to as a streamer. The sonar 11 also comprises a cable 14 allowing the two antennas 12 and 13 to be towed. The cable 14 also carries the signals and power supplies between the ship and the antennas 12 and 13 of the sonar 11. It is also possible to provide two distinct cables, one for towing the towfish 12 and the other for the streamer 13, the cable towing the streamer then being attached to the towfish 12. The invention relates more particularly to the towfish 12 and can be employed without a streamer 13.

The antennas 12 and 13 are mechanically anchored and electrically and/or optically connected to the cable 14 in a suitable manner. In the conventional way, the receive antenna 13 is formed of a linear antenna of tubular shape identical to those found in passive sonars, likeable to the shape of a flute, while the transmit antenna 12 is incorporated into a bulky structure of a shape likeable to that of a fish. The receive streamer is generally positioned to the rear, at the end of the cable 14, the towfish being positioned on the part of the cable 14 closest to the ship 10. During an underwater acoustic mission, the antenna 12 emits sound waves into the water and the receive antenna 13 picks up any echoes bouncing back from targets on which the sound waves from the antenna 12 are reflected.

The launching and retrieval of the antennas 12 and 13 is performed using a winch 16 positioned on a deck 17 of the ship 10. The winch comprises a drum 18 rated to allow the winding of the cable 14 and of the receive antenna 13. The winch 16 also comprises a chassis intended to be attached to the deck of the ship. The drum 18 is able to pivot with respect to the chassis so as to allow the hauling-in of the cable. The hauling-in of the cable 14 allows the towfish 12 to be hauled onboard the ship 10, for example onto a rear platform 19 provided for that purpose.

A fairlead 20 guides the cable 14 downstream of the drum 18. The fairlead 20 constitutes the last element guiding the cable 14 before it descends into the water. The cable 14 for example comprises a core made up of electrical and/or optical conductors transmitting power and data between the sonar equipment situated on board the ship 10 and the antennas 12 and 13. The core of the cable 14 is generally covered with stranded metal wires providing the cable 14 with its mechanical integrity, notably tensile strength. The cable 14 may be covered with scales configured to adapt its hydrodynamic profile in order to limit its drag.

Figure 2:
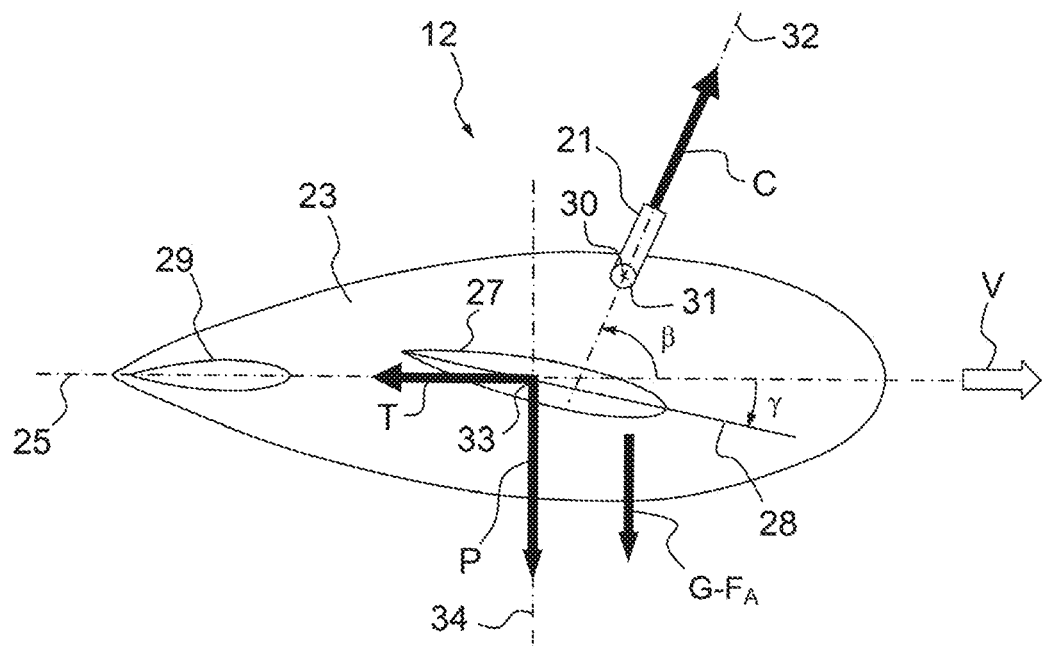
FIG. 2 depicts a towed body of the sonar of FIG. 1.

FIG. 2 depicts the towfish 12 in profile. The towfish 12 comprises a bracket 21 configured to allow the towfish 12 to be attached to the cable 14. The bracket 21 comprises a mechanical connector, possibly removable, and, if need be, a connector, for example an electrical or optical connector, for passing data and/or power between the towfish 12 and the cable 14. The towfish 12 is configured to move through the water in translation in a direction 25 represented as being horizontal in FIG. 2. The towfish 12 comprises a structure 23 and at least one airfoil 27 allowing a downwardly directed hydrodynamic lift P to be generated on the towfish 12 when the towfish 12 is moving in the direction 25. The towfish 12 itself and other appendages of the towfish 12 contribute to generating the overall hydrodynamic lift of the towfish 12. The airfoil 27 chiefly generates the overall hydrodynamic lift of the towfish 12. The airfoil 27 for example has a profile that is symmetrical about a direction 28. In order to generate the lift P, the direction 28 of the airfoil 27 is inclined by an angle γ with respect to the direction 25. The angle γ is oriented negatively in the counterclockwise direction in order to direct the lift P downward. The towfish 12 may also comprise an empennage 29 situated toward the rear of the towfish 12 according to the direction in which the towfish travels in the direction 25. The empennage 29 ensures the stability of the movement of the towfish 12 in the direction 25.

The bracket 21 is able to move in rotation with respect to the structure 23 about a horizontal axis 30 perpendicular to the main direction 25. The axis 30 is perpendicular to the plane of FIG. 2. The horizontal axis 30 and the direction 25 are defined with respect to the exterior shapes of the towfish 12 orienting it in the water when it is being towed by the cable 14. The towfish 12 for example comprises a pivot connection 31 articulating the bracket 21 and the structure 23 to one another. The pivot connection 31 allows the bracket 21 to rotate with respect to the structure 23 about the horizontal axis 30. The bracket 21 for example has a sleeve through which the cable 14 is passed. The sleeve extends along an axis 32. In the vicinity of the bracket 21, the cable 14 also extends along the axis 32. More specifically, the cable 14 and the bracket 21 are secured to one another. The connection between the cable 14 and the bracket 21 is of the fully restrained connection type also known as a built-in connection. An angle β is defined between the axis 32 and the main direction 25 about the horizontal axis 30. In the vicinity of the towfish 12, the cable 14 makes an angle β with the horizontal main direction 25.

The connection between the bracket 21 and the structure 23 may comprise more than one degree of freedom in rotation. It may involve a pinned ball joint with two degrees of freedom or a ball joint with three degrees of freedom. For implementing the invention, only the angle β defined about the horizontal axis 30 is taken into consideration.

As it moves in the direction 25 the towfish is subjected to various forces aside from the lift P: its weight G and the upthrust $F_A$, both represented by the same vector in FIG. 2, its drag T and the traction C exerted by the cable 14. In order not to overload FIG. 2, it is assumed that the antenna 13 is absent. The potential presence of an antenna 13 will increase the drag P. To a first approximation, when the towfish 12 is advancing at constant speed in the direction 25, the vector sum of the various forces to which it is subjected is zero. In order to ensure static equilibrium of the forces exerted on the towfish, the angle β satisfies the following relationship:

$$\beta = \arctan(G - F_A + P/T) \quad (1)$$

The towfish 12 comprises means for modifying the hydrodynamic lift of the airfoil 27 and therefore the overall hydrodynamic lift P of the towfish 12. The lift P is considered here to be positive when directed downward. During operational use, the towfish 12 has a lift referred to hereinafter as the operational lift. This lift is provided by an angle γ of inclination of the airfoil 27 oriented downward. The sign of the angle γ is considered to be positive in the counterclockwise direction. The angle γ therefore has a negative value, for example of the order of −8°, in order to direct the lift P downward and allow the towfish 12 to perform its mission under operational conditions. Naturally, this angle value can be adapted according to the desired lift and according to the profile of the airfoil 27.

In order to reduce the traction C that the cable 14 has to absorb in order to tow the towfish 12, the lift P of the towfish 12 is reduced by modifying the angle γ. Specifically, by reducing the lift P, the vector sum of the forces exerted on the towfish 12 to balance the traction C is reduced, as therefore is the modulus of the traction C.

The reduction in lift P can be brought about by means of a one-piece airfoil the inclination of which can be modified. It is also possible to attach a mobile flap to the end of a fixed airfoil.

The reduction in lift may of course go so far as to cancel the lift and even render same negative, namely directed upward and tending to cause the towfish 12 to rise back toward the surface. However, a lift that is excessively negative would tend to increase the traction C on the cable 14. A raising of the towfish 12 may offer an advantage if a raised bottom appears.

For a given angle γ, the lift P and the drag T are functions of the speed V of the towfish 12 in the direction 25. This speed is, to a first approximation, equal to the speed of the ship 10 when the towfish 12 is in equilibrium. The more the speed P increases, the greater the lift P and drag T. In order to maintain equilibrium between the forces exerted on the towfish 12, the algebraic value of the traction C increases and the angle β increases also. For a given angle γ, there is a function connecting the angle β and the algebraic value of the traction T. In practice, the angle β varies according to the lift P and drag T. The dimensions of the towfish 12 are defined in such a way that the angle β varies as a function of the speed V. In the case illustrated, when the speed V increases, the algebraic value of the drag T increases more than the algebraic value of the lift P. Thus, when the speed V increases, the angle β decreases. Alternatively, it would be possible to define a towfish such that when the speed V increases, the algebraic value of the drag T increases less than the algebraic value of the lift P.

The invention takes advantage of this relationship to control the orientation γ of the airfoil 27 as a function of the angle β. By reducing the angle γ and thereby the lift P of the airfoil 27, in order to keep the towfish 12 in equilibrium, the modulus of the traction C is reduced.

In other words, according to the invention, the orientation of the airfoil 27, defined by the angle γ, is a function of an angle formed between the bracket 21 and the structure 23 about the horizontal axis 30. For the sake of simplification, this angle will be considered to be the angle β between the cable 14 in the vicinity of the towfish 12 and the main direction 25. In practice, the angle between the bracket 21 and the structure 23 which is the angle used to modify the orientation of the airfoil 27 may be offset by a fixed value according to the configuration of the means of attachment of the cable 14 to the bracket 21. To ensure correct operation of the invention, a variation in the angle β leads to a variation in the orientation of the airfoil 27.

Figure 3:
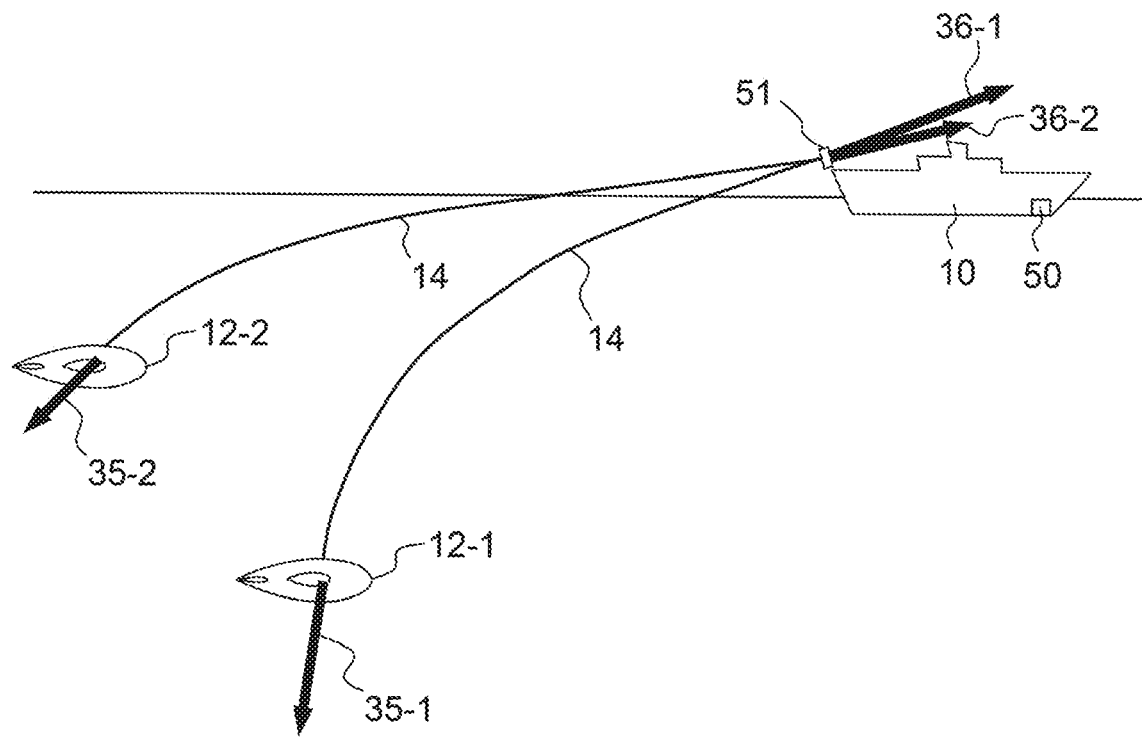
FIG. 3 depicts the ship of FIG. 1 towing the towed body in two hydrodynamic configurations of the towed body.

FIG. 3 depicts two configurations in which the ship 10 is towing the towfish 12. The first configuration is the operational configuration and the towfish 12 is identified as 12-1. In the operational configuration, the airfoil 27 provides a downwardly-directed lift. The vector sum of the forces due to the weight G, to the upthrust $F_A$, to the drag T and to the lift P is identified 35-1. This vector sum is opposing the traction C of the cable 14 on the towfish 12. At the ship 10, the resultant 35-1 leads to a traction force 36-1 on the cable 14. The second configuration is referred to as the evasion configuration, and the towfish is identified 12-2. In the evasion configuration, controlled by a variation in the angle β, the lift of the airfoil 27 has been reduced. The vector sum of the forces due to the weight G, to the upthrust $F_A$, and to the drag is identified 35-2. It is considered that, in the evasion configuration, the lift P is zero. At the ship 10, the resultant 35-2 leads to a traction force 36-2 on the cable 14.

The modulus of the traction force 36-2 is less than the modulus of the traction force 36-1. If the entire towing setup (winch, cable and towfish) is rated to operate with a force 36-1 at a given speed for the ship 10, the act of reducing the lift of the towfish 12 allows the given speed to be increased until a force 36-2 is reached of which the modulus is equal to the modulus of the force 36-1 at the lower speed.

FIG. 2 depicts just a single airfoil 27 on one side of the towfish 12. It is conventional practice for the towfish 12 to comprise two airfoils 27 each positioned symmetrically with respect to the direction 25. In that case, the means for modifying the orientation γ apply advantageously to the two airfoils 27 in a coordinated manner. More generally, the towfish 12 may comprise more than two airfoils all generating a downwardly directed lift. The invention is already beneficial in reducing the lift on one of the airfoils. Conversely, the towfish 12 could comprise just a single airfoil, for example positioned on the nose of the towfish 12. The invention then consists in reducing the lift of this single airfoil.

In FIG. 2, the airfoil 27 is able to move in rotation with respect to the structure 23 about a horizontal axis 33 parallel to the axis 30 of rotation of the bracket 21. The empennage 29 of the towfish 12 is in this instance fixed with respect to the structure 23. This configuration allows the overall pitch attitude of the towfish 12 to be maintained when the angle γ is modified. The directions of the weight G and of the upthrust $F_A$ are unchanged with respect to the structure 23. The towfish then finds itself in the best conditions for withstanding an increase in its speed. Alternatively, it is possible to keep one airfoil fixed with respect to the structure 23 and to act on the orientation of the empennage in order to modify the lift of the airfoil. This mobile-empennage configuration limits the forces that need to be exerted on the mobile appendage, in this instance the empennage, in order to reduce the lift of the towfish 12.

The appendices intended to vary the pitch attitude of an object traveling through a fluid, through air or through water, are usually articulated about an axis situated in the vicinity of their leading edge, in order to ensure their stability. To implement the invention, it is advantageous to position the axis 33 of rotation of the airfoil 27 with respect to the structure 23 substantially at the instantaneous center of rotation of the towfish 12 as it pivots as a result of a modification to the orientation γ of the airfoil 27. This arrangement limits the torque that has to be applied in order to cause the airfoil 27 to turn.

Figure 4:
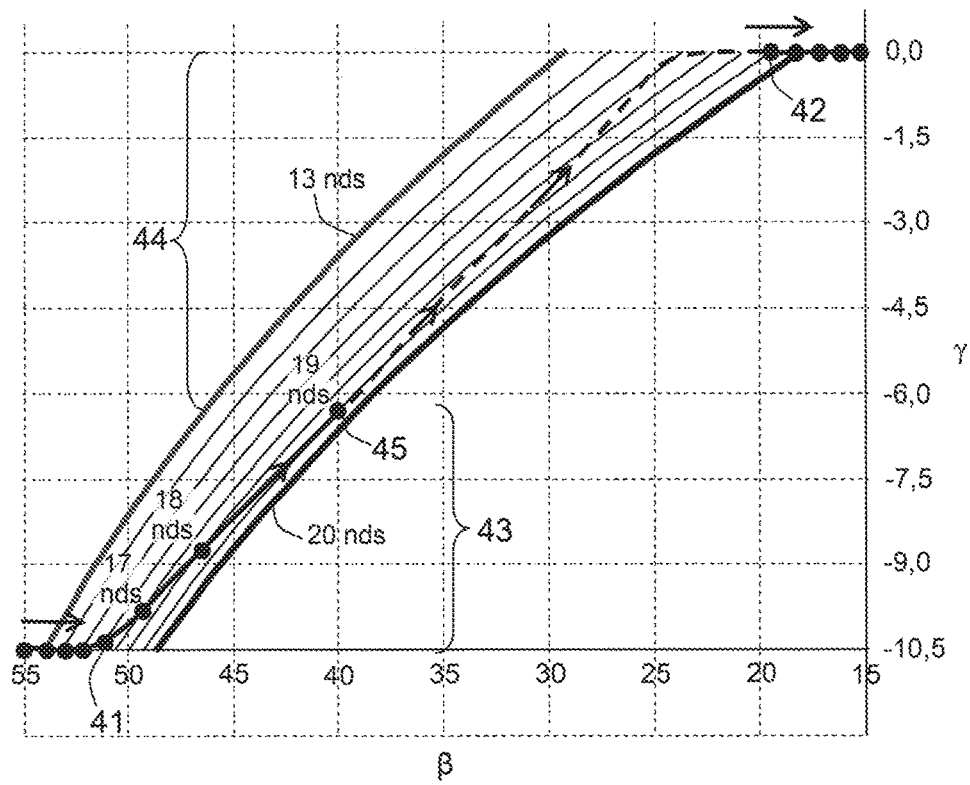
FIGS. 4 and 5 depict one example of the control law controlling the angle of orientation of an appendage of the towfish as a function of an angle of a bracket of the towfish to which bracket the towing cable is attached.
Figure 5:
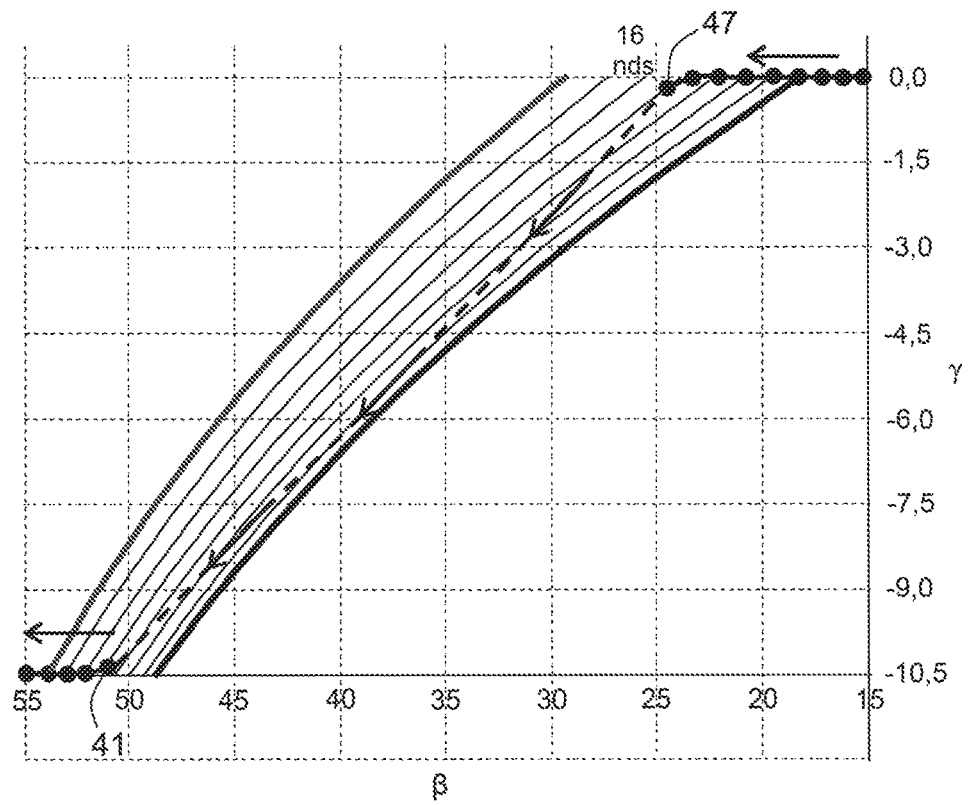

FIGS. 4 and 5 depict one example of a control law controlling the angle γ of orientation of the airfoil 27 as a function of the angle β of the bracket 21 with respect to the structure 23. In these two figures, the angle β is represented on the abscissa axis and the angle γ on the ordinate axis. For this law, FIG. 4 represents the change in angle γ as the angle β decreases and FIG. 5 as the angle β increases. The law is depicted on an array of curves each representing, at a given speed V, the angle β that the bracket 21 naturally adopts as a function of the angle γ of orientation of the airfoil 27 in the absence of a control law. In other words, for a chosen speed V and a chosen angle γ, the various forces exerted on the towfish 12 balance one another for a given bracket angle β. These curves and the associated numerical values are given only by way of example and are dependent on the geometry and weight of the towfish 12. In FIGS. 4 and 5, the array of curves is represented in steps of 1 knot between 13 knots and 20 knots. It will be recalled that a knot is equivalent to approximately 0.514 m/s. Knots are used here rather than the si units for speed because knots are more commonly used in the maritime domain.

The law is defined in such a way that, between the two extreme speeds of 13 and 20 knots, there is a transition between the operational lift value and the evasion lift value.

For example, for a speed of below 16 knots, the airfoil 27 is oriented downward in order to obtain operational lift. In FIGS. 4 and 5, the angle γ is set at a first value, for example a negative value of −10.5°, in order to obtain the operational lift. For a speed lower than 16 knots, the bracket angle is greater than 52° and the angle γ remains constant at the value of −10.5°. The law is defined in such a way as to reduce the angle γ when the bracket angle drops below 52°. The threshold at which the reduction in the lift of the airfoil 27 is triggered is set at 52°. This threshold bears the reference 41 in FIG. 4. In other words, because there is a relationship between the bracket angle β and the speed V, the angle γ is reduced when the speed becomes higher than 16 knots.

A second threshold 42 for the angle β is also defined, and below this threshold the angle γ of orientation of the airfoil 27 is fixed at a second value higher than the value defined when the bracket angle β is above the first threshold 41. The second angle value γ may remain negative or positive or zero. In the example illustrated, the second value is 0°. A positive value may offer the benefit of generating an upward lift and of partially compensating for the weight G. In the example depicted, at the threshold 42, the value of the angle β is 19°. At this value, the lift is reduced compared with the operational lift. This lift may be referred to as the evasion lift.

Between the two thresholds 41 and 42, the control law controlling the angle γ may adopt various forms. It is for example possible to define stable and unstable parts of the control law. A part of the law is said to be stable for a given value of β when the derivative of the function γ=f(β) is lower than the derivative of the speed curve in the β-γ frame of reference. Conversely, a part of the law is said to be unstable, for a given value β, when the derivative of the function γ=f(β) is greater than the derivative of the speed curve in the β-γ frame of reference. In a stable part of the law, when the towfish 12 passes through a given speed V, there is the same value for the angles β and γ both when the speed is increasing and when the speed is decreasing. By contrast, in an unstable part of the control law, when the towfish is accelerating and reaches a given speed, the angle γ of orientation of the airfoil 27 is such that the angle β of the bracket 21 has a tendency to reduce automatically, at the same time leading to an increase in the angle γ until a stable part of the control law is reached.

In the example depicted, in FIG. 4, when the angle β decreases, namely when the speed of the towfish 12 increases above 16 knots, the control law is stable up to a bracket angle of 40° corresponding to a speed of 19 knots. This stable part is identified 43 in FIG. 4. Beyond the bracket angle β of 40°, the control law enters an unstable part 44. In other words, if, at 19 knots, the towfish 12 tends to accelerate, the angle γ of orientation of the airfoil 27 tends to increase together with a reduction in the angle β of the bracket 21 until the threshold 42 is reached, keeping the 19-knot speed substantially constant, give or take its acceleration. In the example illustrated using FIG. 4, the threshold 42 corresponds to a bracket angle β of 19° and to an angle of orientation γ of the airfoil 27 of 0°. The threshold between the stable and unstable parts is identified as 45 in FIG. 4. The unstable part of the curve allows the lift of the airfoil 27 and the bracket angle β to be reduced rapidly. The modulus of the traction C also decreases rapidly, thereby allowing the ship 10 to accelerate further for better evasion.

In other words, in the stable part of the control law, in the β-γ frame of reference, the gradient of the curve defining the control law is shallower than the gradient of each of the curves of the bundle defining the equilibrium of the towfish 12 as a function of the angles β and γ. More specifically, the curve defining the control law intercepts a number of curves of the bundle and, at each intersection, the gradient of the curve defining the control law is shallower than the curve of the bundle. By contrast, in the unstable part of the control law, the gradient of the curve defining the control law is steeper than the intercepted curve of the bundle. When applied to the example of FIG. 4, when the speed increases and reaches 19 knots, the towfish 12 automatically rises back up until the point of equilibrium defined by the threshold 42 is reached. In practice, the towfish 12 can take several minutes to pass through the unstable part and cross from the point 45 to the point 42 as a result of its inertia.

If the ship 10 continues to accelerate beyond 19 knots, the angle β of the bracket 21 will continue to decrease, but the angle γ of orientation of the airfoil 27 remains fixed at a value of 0°. The ship can exceed 20 knots with a reduced traction force on the cable 14 compared with the traction force that would be generated with an operational lift obtained with an angle γ of orientation of the airfoil 27 of −10.5°.

When the speed of the towfish 12 is decreasing, reference is made to FIG. 5. The control law γ=f(β) is, in the example considered, the same for acceleration and for deceleration. It is also possible to define different control laws for acceleration and deceleration, depending on the desired effects.

As long as the speed of the towfish 12 is above 16 knots, the angle γ of orientation of the airfoil 27 remains at 0°. At 16 knots, equilibrium of the towfish 12 is obtained for β=25° and γ=0°. This point of equilibrium is identified 47 in FIG. 5. When, at 16 knots, the towfish 12 begins to decelerate, the angle γ of orientation of the airfoil 27 tends to decrease while at the same time the angle β of the bracket 21 tends to increase until the threshold 41 is reached, with the speed of 16 knots remaining substantially constant, give or takes its deceleration. When the speed of the towfish 12 is decreasing, the control law between the two angles γ of orientation of the airfoil 27 from 0° to −10.5° is completely unstable. Specifically, in the transition from the point 47 to the point 41, the curve defining the control law intercepts the curves of constant velocity higher than 16 knots of the bundle. Because the speed of the towfish 12 is lower than the curves of the bundle through which curves the control law curve passes, the towfish 12 automatically tends toward the point 41 where β=52° and γ=−10.5°.

The unstable part of the control law provides hysteresis between acceleration and deceleration. More specifically, during acceleration, the speed of 19 knots needs to be achieved in order to enter the unstable part and reach the threshold 42. By contrast, in deceleration, as long as the speed remains above 16 knots, the orientation γ of the airfoil 27 remains at its value of 0°.

In the example depicted, the control law comprises a stable part and an unstable part. It is possible to define the entirety of the law in a stable domain. There is then no hysteresis. Conversely, it is possible to define the control law so that it is completely unstable between the two thresholds 41 and 47, and this makes it possible to reduce the traction on the cable more quickly. A control law defined as being completely unstable has a tendency to increase the hysteresis. Too much hysteresis would require the ship 10 to slow too much in order to recover operational lift.

It is preferable to avoid defining a control law that follows one of the curves of the bundle, namely between the stable and unstable domains. This is because if it did, and the ship 10 maintained that speed, there would be a risk of the airfoil 27 oscillating between its two threshold orientations.

Figure 6:
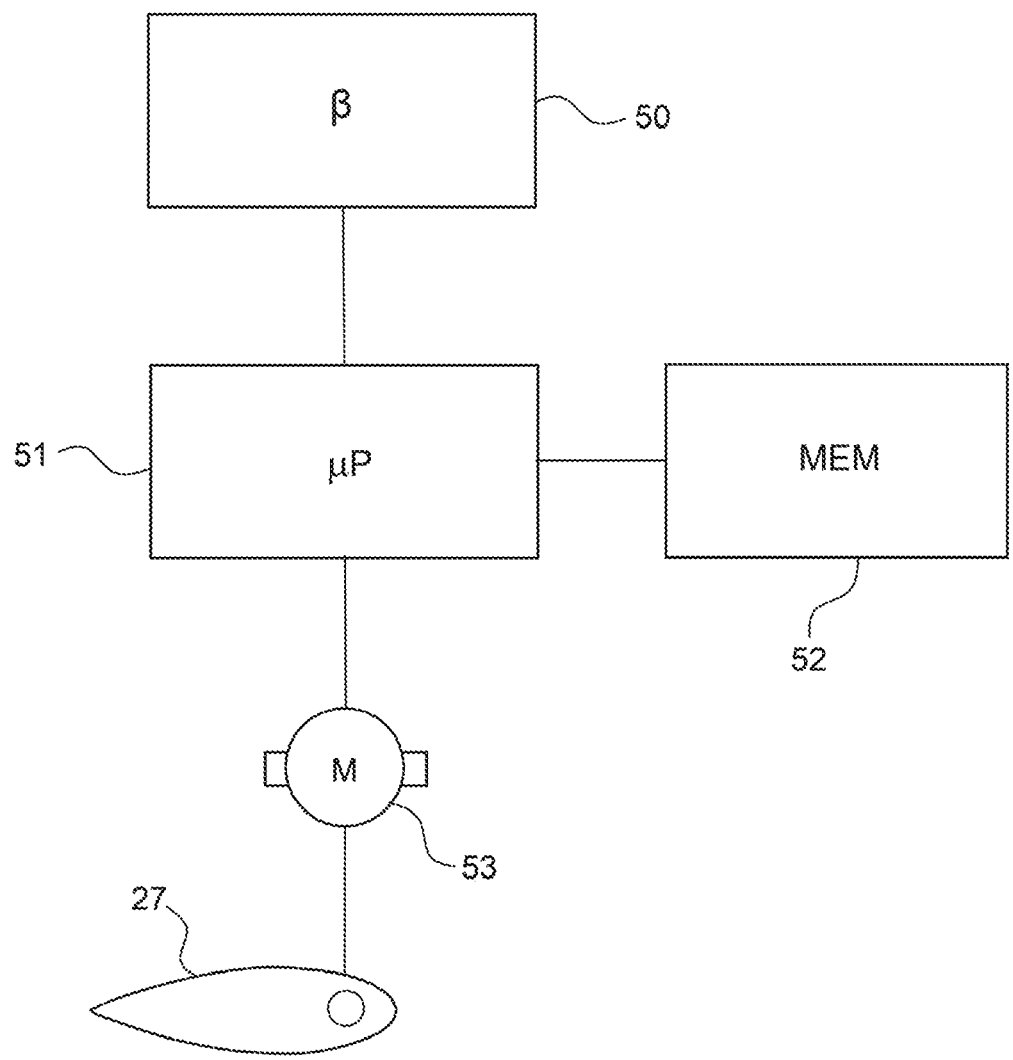
FIG. 6 depicts a first embodiment of the control of the orientation of the appendage as a function of the angle of the bracket.

FIG. 6 describes a first embodiment of the control of the orientation of the airfoil 27 as a function of the angle β. The towfish 12 comprises an angle sensor 50 for determining the angular position of the bracket 21 with respect to the structure 23. The sensor 50 is, for example, a resolver positioned in the pivot connection 31. Any other type of angle sensor can be used. The towfish 12 also comprises a computer 51, a memory 52 and an actuator 53 for modifying the orientation of the airfoil 27 about its axis 33. The actuator 53 may be an electric stepping motor orienting the airfoil 27. It is possible to use a microcontroller to perform the functions of the computer 51 and of the memory 52. The computer 51 is configured to control the actuator 53 as a function of the angle β determined by the sensor 50. The memory 52 contains the control law controlling the actuator 53 as a function of the angle β and a program for implementing the control law.

The chief benefit of the first embodiment lies in its operational flexibility. Specifically, it is possible to modify the control law easily by replacing the contents of the memory 52. By contrast, the presence of electron components may impair the reliability of this embodiment.

Figure 7A:
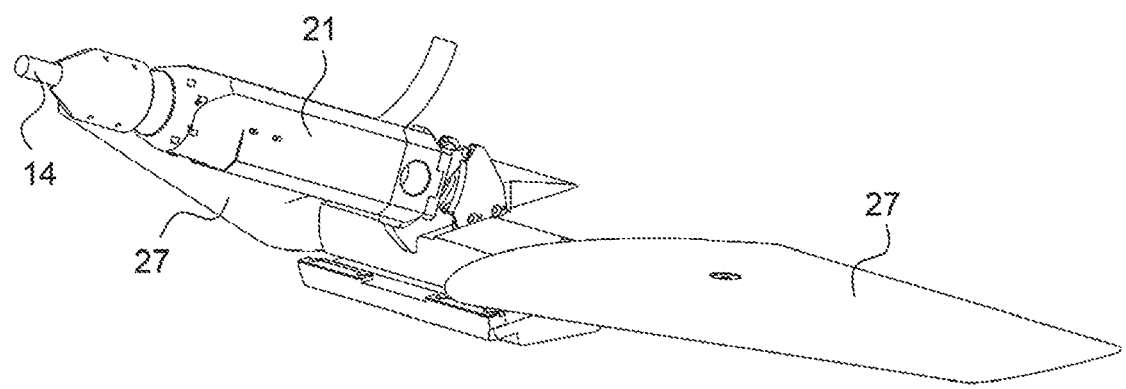
FIGS. 7a, 7b and 7c depict a second embodiment of the control of the orientation of the appendage as a function of the bracket angle.
Figure 7B:
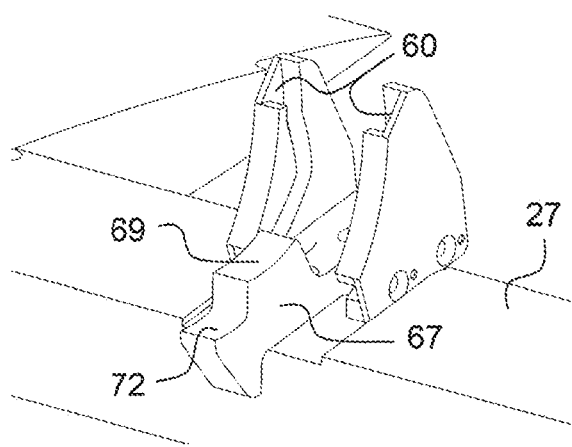
Figure 7C:
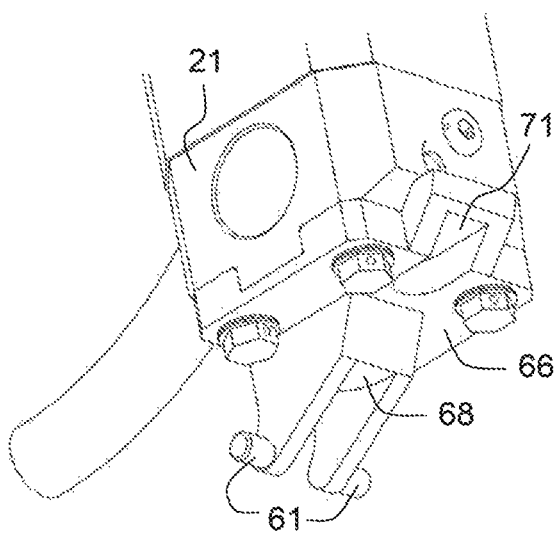

FIGS. 7a, 7b and 7c describe a second embodiment of the control of the orientation of the airfoil 27 as a function of the angle β. The second embodiment is fully mechanical without motorized drive. It is only the hydrodynamic forces (drag and lift), the force of gravity, the traction on the cable and the upthrust applied to the towfish 12 that allow the orientation γ of the airfoil 27 to be modified as a function of the angle β. The towfish 12 comprises a cam and a cam follower. In the example depicted, the cam is secured to the airfoil 27 and the cam follower is secured to the bracket 21. Alternatively, it is also possible to provide a cam secured to the bracket 21 and a cam follower secured to the airfoil 27. The cam follower presses against a shape on the cam as the bracket 21 rotates about the horizontal axis 30. The shape of the cam defines the control law γ=f(β).

The cam and the cam follower are advantageously positioned inside the structure 23 so that this mechanism does not alter the hydrodynamic shapes of the towfish 12. FIG. 7a is a perspective depiction of the bracket 21, two airfoils 27 together with the cam and cam follower. For ease of understanding, the structure 23 is not depicted. FIG. 7b is a perspective depiction of the cam secured to the airfoils 27 and FIG. 7c depicts the cam follower secured to the bracket 21.

In the example depicted, the cam is formed by two symmetrical slots 60 and the cam follower is formed by two pins 61, each one guided in one of the slots 60. It was seen earlier that the axis 33 of rotation of the airfoil 27 with respect to the structure 23 may be positioned so that it is substantially secant with a vertical axis 34 bearing the lift force generated by the airfoil 27. That makes it possible to limit the torque needed to turn the airfoil. This torque may even be near-zero, negative or positive. In this configuration, it is beneficial to make provision for the cam follower to press on the cam in two directions. The slots 60 allow for this two-directional pressure. In other words, in each of the slots, the pin 61 in question can press against one of the lateral faces of the corresponding slot 60.

Other forms of cam and cam follower are of course possible within the context of the invention.

FIGS. 8a to 8f depict various orientations γ of the airfoil 27 as a function of the angle β of the bracket 21 for the second embodiment. The description of these figures is given for an angle β that is increasing from FIG. 8a toward FIG. 8f. Conversely, when the angle β decreases, the relative configuration of the bracket 21 and of the airfoil 27 pass from FIG. 8f toward FIG. 8a.

Figure 8A:
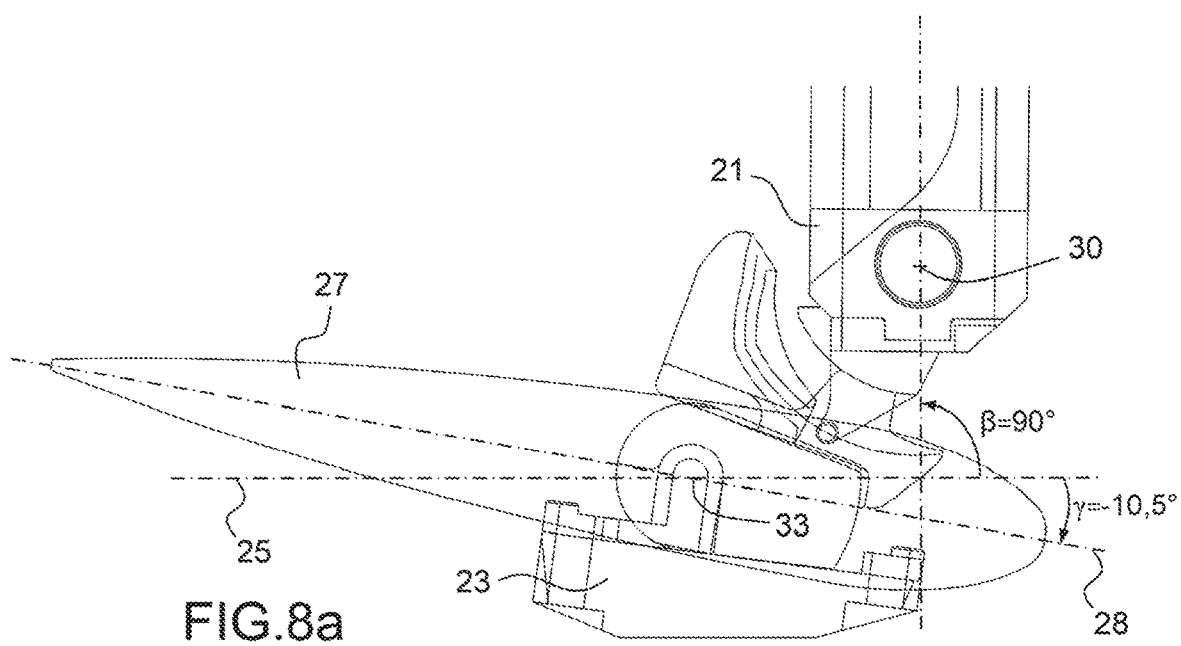
FIGS. 8a to 8f depict various orientations of the appendage as a function of the angle of the bracket for the second embodiment.
Figure 8B:
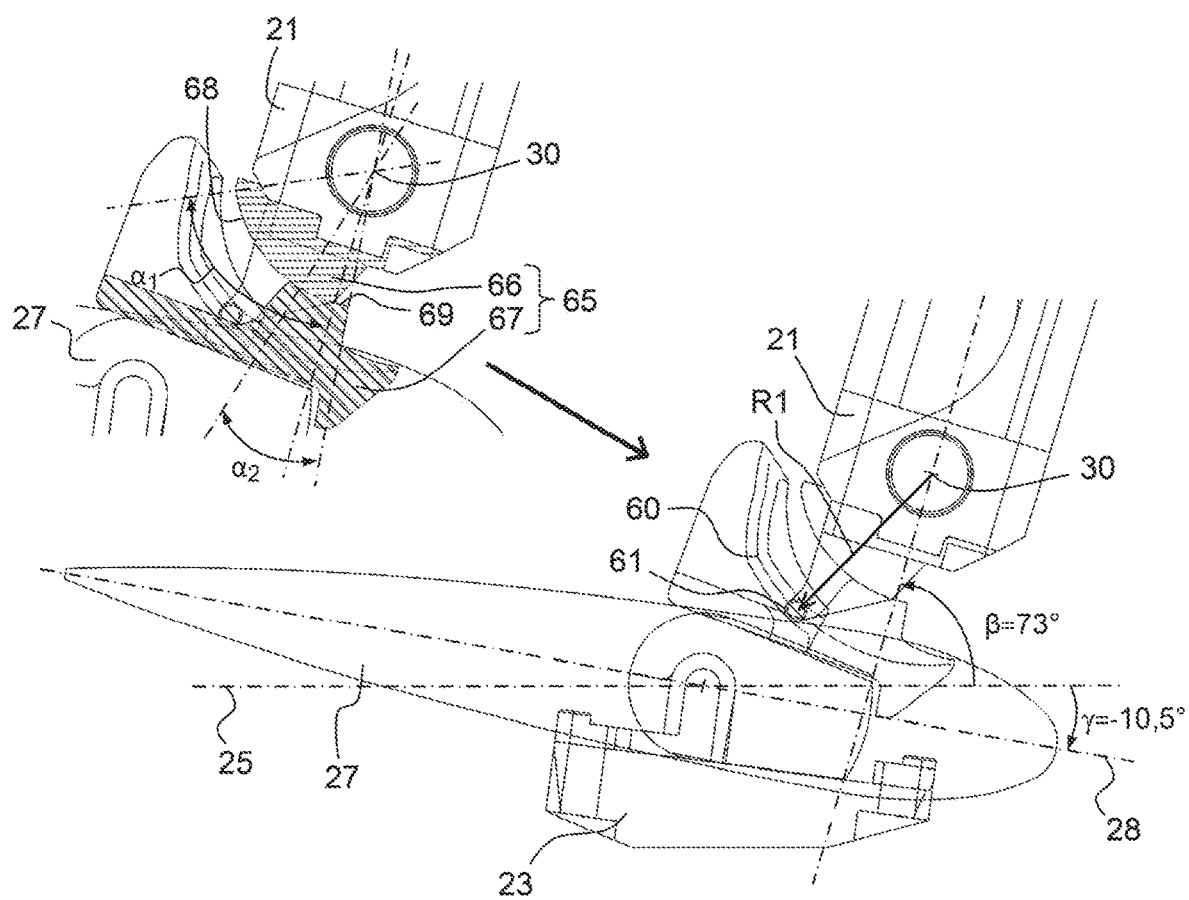

In FIG. 8a, the bracket angle β is equal to 90° and the orientation γ of the airfoil 27 is −10.5°. Such a configuration may notably be obtained in the event of a zero speed of the ship 10. In FIG. 8b, the bracket angle β is equal to 73° and the orientation γ of the airfoil 27 is also −10.5°. In these two configurations, the bracket angle β is above the threshold 41 and the orientation γ of the airfoil 27 remains constant so as to generate the operational lift.

As long as the bracket angle β remains above the threshold 41, the cam profile, which is to say the shape of the slots 60 against which the two pins 61 press, is an arc of a circle of radius R1 centered on the axis 30 of rotation of the bracket 21. It is possible to secure this part of the control law by adding a latch 65 formed of two mechanical components 66 and 67, one of them, 66, attached to the bracket 21 and the other, 67, attached to the airfoil 27. In practice, when the towfish 12 is being launched or recovered by the ship 10, the bracket angle β is generally equal or close to 90° because the towfish 12 is suspended out of the water by the cable 14. During these maneuvers, there is a risk that the airfoil 27 may be knocked. The latch 65 allows these various knocks to be absorbed in order to prevent stressing the slots 60 and the pins 61.

The latch 65 is visible in an inset of FIG. 8b, in which inset the two mechanical components 66 and 67 are depicted in section. The component 66 comprises a cylindrical portion 68 centered on the axis 30 and extending in an angular sector $\alpha_1$. The component 67 comprises a cylindrical portion 69 centered on the axis 30 and extending in an angular section $\alpha_2$. The two cylindrical portions 68 and 69 have the same radius, give or take a functional clearance, and press against one another as long as the angle β remains above the threshold 41. In the rotation of the bracket 21, when the angular sector $\alpha_1$ is overlapping the angular sector $\alpha_2$, the latch 65 prevents any rotation of the airfoil 27 and the angle γ remains set at a value of −10.5°. When the angular sector $\alpha_1$ is no longer overlapping the angular sector $\alpha_2$, the latch 65 is released. When the two angular sectors $\alpha_1$ and $\alpha_2$ overlap, the cam profile is an arc of a circle of radius R1. It is even possible to disperse partially with a cam. For example, for β=90°, the pins 61 are no longer pressing against the corresponding slots 60. The slots 60 take over from the latch 65 before the angular sectors $\alpha_1$ and $\alpha_2$ have stopped overlapping. The shapes employed for the latch 65 may also be employed to set the value of the angle γ to the value of 0° when the angle β is below the value of the threshold 42.

Figure 8C:
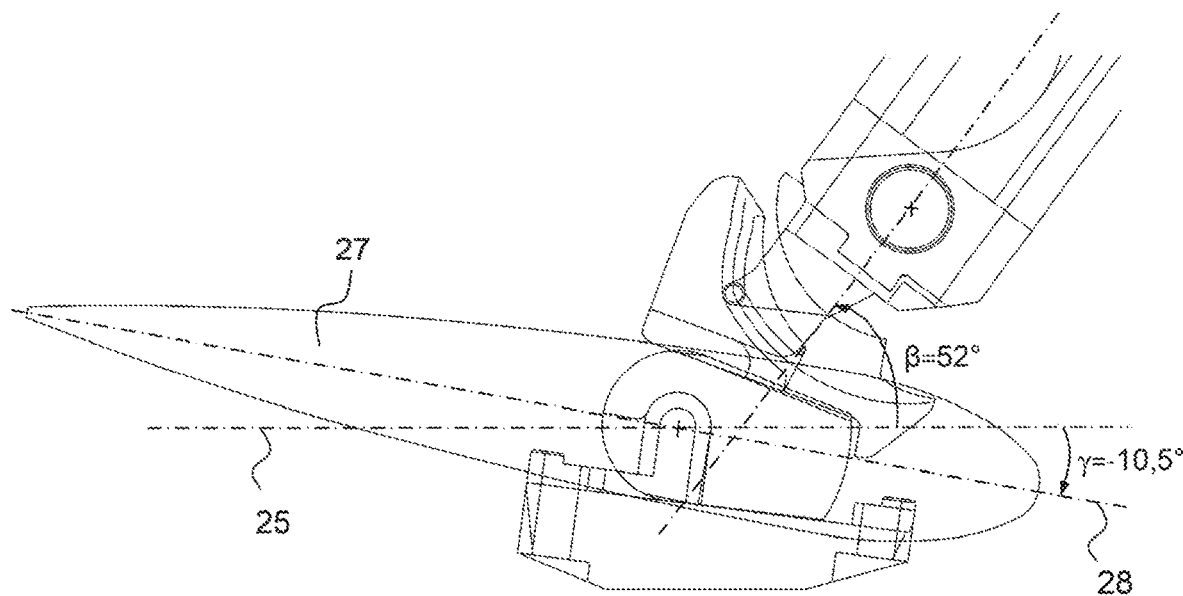
Figure 8D:
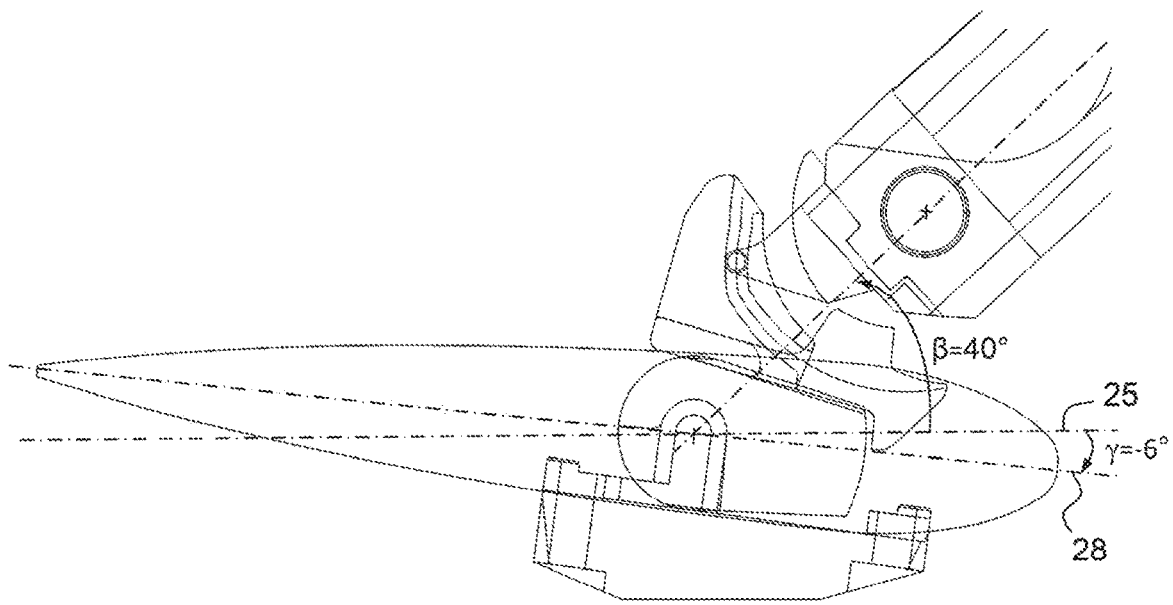
Figure 8E:
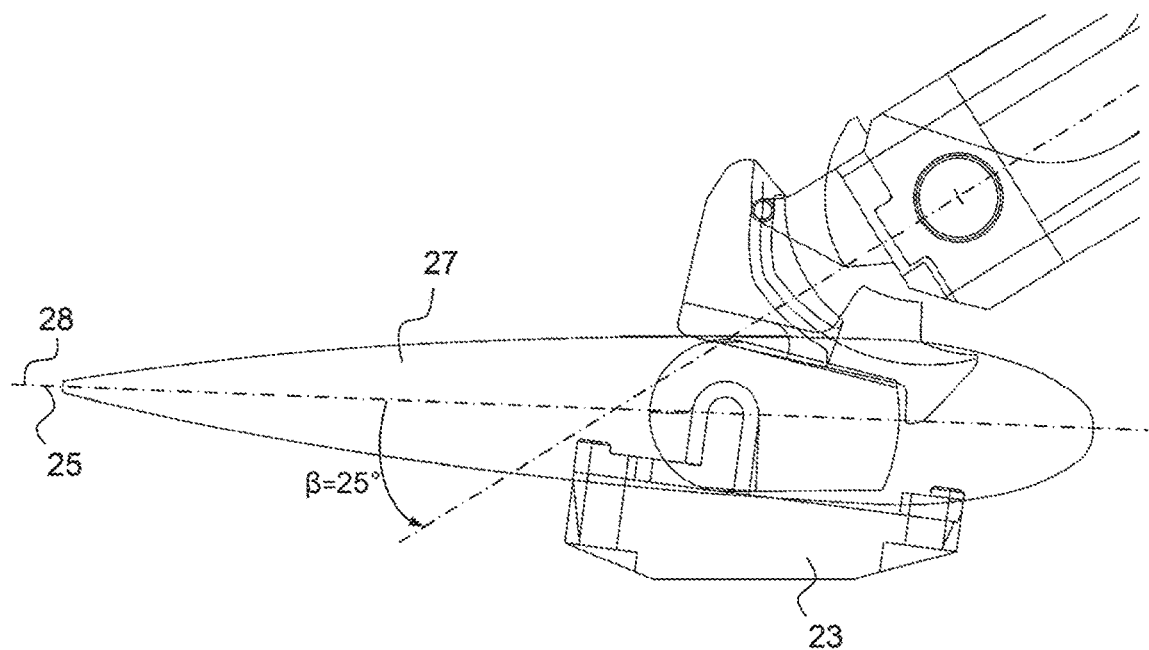
Figure 8F:
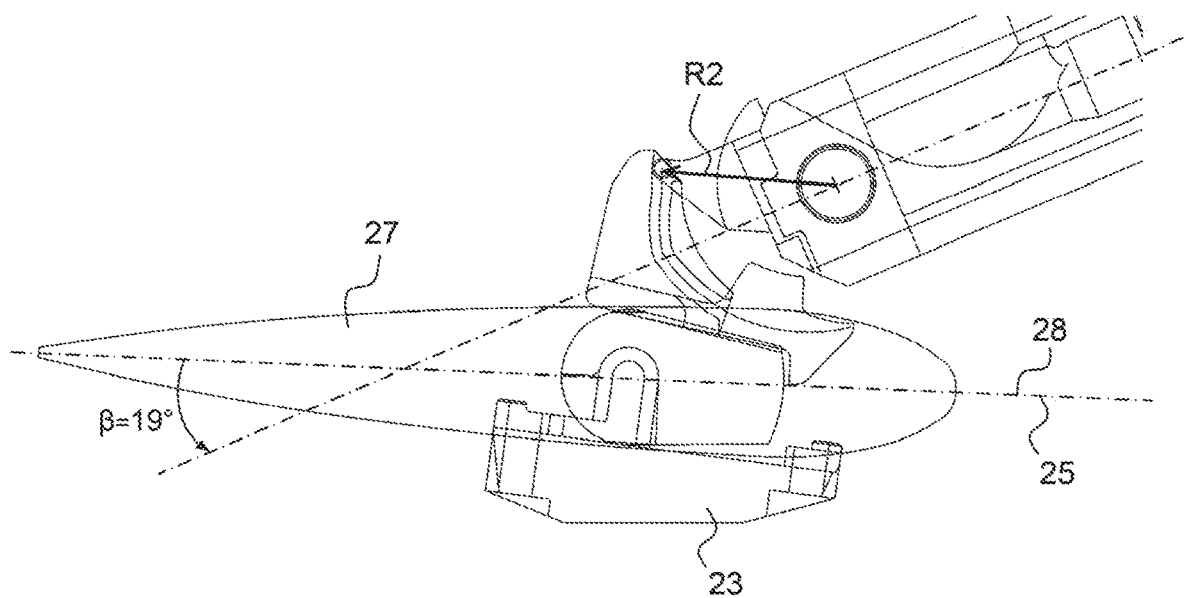

In FIG. 8c, the latch 65 is released and the bracket angle β reaches the threshold 41 at a value of 52°. The orientation γ of the airfoil 27 is still −10.5°. In FIG. 8d, the bracket angle β reaches the threshold 45 at a value of 40°. The orientation γ of the airfoil 27 is −6°. In FIG. 8e, the bracket angle β is 25°. This angle β corresponds to the point of equilibrium 47 depicted in FIG. 5. The orientation γ of the airfoil 27 is 0° here. In FIG. 8f, the bracket angle β reaches the threshold 42 and has a value of 19° without modifying the orientation γ of the airfoil 27 at 0°. Beyond the threshold 42, the orientation γ of the airfoil 27 remains constant at 0°. A second latch may immobilize the bracket 21 with respect to the structure 23 when the angle β reaches a minimum value, 15° in the example depicted. The latch may be produced using the two mechanical components 66 and 67 each comprising an end stop, 71 and 72 respectively, bearing against one another when the angle β reaches the desired value. The two end stops 71 and 72 of the latch are visible in FIGS. 7b and 7c. Like with the latch 65, the shapes of the end stops 71 and 72 may be used to immobilize the bracket 21 with respect to the structure 23 when the angle β reaches a maximum value, for example 90° as depicted in FIG. 8a.

The invention claimed is:

1. A towfish configured to be submerged and towed by a cable, the towfish comprising:
    a structure configured to move through water in a horizontal main direction and at least one appendage configured to generate on the towfish a downwardly directed hydrodynamic lift when the towfish is moving through the water under the effect of towing, the appendage being orientable so as to modify lift on the appendage,
    the towfish comprising a bracket capable of rotational movement with respect to the structure about a horizontal axis perpendicular to the horizontal main direction, wherein the cable is configured to be attached to the bracket, comprising a non-motorized mechanism configured so that an orientation of the appendage, allowing the lift on the appendage to be altered, is dependent on an angle formed between the bracket and the structure defined on the basis of the horizontal main direction, and wherein a law connecting the angle to the orientation of the appendage is configured so that when a value of the angle decreases, the orientation of the appendage is increased in such a way as to reduce the hydrodynamic lift on the towfish,
    wherein the towfish has a weight and is subjected in the water to an upthrust force, such that a resulting force of the weight of the towfish and upthrust force on the towfish directs the towfish downwards,
    further comprising a cam and a cam follower, one being secured to the appendage and the other to the bracket, and wherein the cam follower presses against a shape on the cam as the bracket rotates about the horizontal axis.

2. The towfish as claimed in claim 1, wherein over a range of values for the angle, the law is unstable so that a given value for the orientation of the appendage leads to a reduction in the angle.

3. The towfish as claimed in claim 1, wherein beyond a first given angle value, the orientation of the appendage is fixed so as to generate an operational lift of the towfish, and wherein below the first given angular value, the orientation of the appendage is increased as the value of the angle decreases so as to reduce the lift on the appendage compared with the operational lift.

4. The towfish as claimed in claim 3, wherein below a second given angular value less than the first given angular value, the orientation of the appendage is fixed so as to generate an evasion lift lower than the operational lift.

5. The towfish as claimed in claim 4, wherein below the second given angular value, the orientation of the appendage is positive or zero.

6. The towfish as claimed in claim 4, wherein there is defined a third angle value intermediate between the first and second angle value, and wherein, between the first and the third angle value, a law connecting the angle to the orientation of the appendage is configured to keep the angle at a stable value.

7. The towfish as claimed in claim 4, wherein the range of values for the angle wherein the law is unstable is defined between the third and the second angle value, and wherein the law is configured in such a way as to orient the appendage in order to achieve the evasion lift.

8. The towfish as claimed in claim 1, comprising a lift-inducing airfoil forming the appendage, and a stabilizing empennage configured to keep a pitch attitude of the towfish substantially constant during changes to the orientation of the appendage.

9. The towfish as claimed in claim 1, wherein the appendage is able to move in rotation with respect to the structure about a second horizontal axis, a mobility of the appendage allowing the hydrodynamic lift on the towfish to be modified, and wherein the second horizontal axis of rotation of the appendage is positioned substantially at an instantaneous center of rotation of the towfish when the latter pivots as a result of a change in the orientation of the appendage.

10. The towfish as claimed in claim 9, wherein beyond a first given angle value, the orientation of the appendage is fixed so as to generate an operational lift of the towfish, and wherein below a first given angular value, the orientation of the appendage is increased as the value of the angle decreases so as to reduce the lift on the appendage compared with the operational lift, further comprising a first latch configured to keep the appendage in a fixed orientation when the value of the angle is beyond the first given angle value.

11. The towfish as claimed in claim 1, wherein below a second given angular value less than a first given angular value, the orientation of the appendage is fixed so as to generate an evasion lift lower than an operational lift further comprising a second latch configured to immobilize the bracket with respect to the structure when the value of the angle formed between the bracket and the structure is below the second given angle value.

* * * * *